(12) United States Patent
Qin et al.

(10) Patent No.: US 9,472,134 B1
(45) Date of Patent: Oct. 18, 2016

(54) ARRAY SUBSTRATE AND METHOD FOR MANUFACTURING THE SAME, FLEXIBLE DISPLAY DEVICE AND ELECTRONIC PRODUCT

(71) Applicant: BOE TECHNOLOGY GROUP CO., LTD., Beijing (CN)

(72) Inventors: Wei Qin, Beijing (CN); Weifeng Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 14/402,971

(22) PCT Filed: Apr. 8, 2014

(86) PCT No.: PCT/CN2014/074890
§ 371 (c)(1),
(2) Date: Nov. 21, 2014

(87) PCT Pub. No.: WO2015/032198
PCT Pub. Date: Mar. 12, 2015

(30) Foreign Application Priority Data

Sep. 4, 2013 (CN) .......................... 2013 1 0397778

(51) Int. Cl.
*G09G 3/20* (2006.01)

(52) U.S. Cl.
CPC .... *G09G 3/2092* (2013.01); *G09G 2300/0809* (2013.01); *G09G 2380/02* (2013.01)

(58) Field of Classification Search
CPC ..................................................... G09G 3/2092
USPC ............................................................ 345/206
See application file for complete search history.

(56) References Cited

U.S. PATENT DOCUMENTS

2014/0138637 A1* 5/2014 Yang .................... H01L 27/1218
257/40

* cited by examiner

*Primary Examiner* — Fred Tzeng
(74) *Attorney, Agent, or Firm* — Harness, Dickey & Pierce, P.L.C.

(57) ABSTRACT

An array substrate provided by an embodiment of the present invention may include a flexible substrate and an array layer formed on the flexible substrate. The array layer may includes signal transmission lines, which include a plurality of data lines and a plurality of gate lines intersected with each other on the flexible substrate to form a plurality of sub-pixel regions; and thin film transistors, each of which is provided in a corresponding sub-pixel region of the plurality of sub-pixel regions and connected to a corresponding data line and a corresponding gate line. An angle between at least a portion of the signal transmission lines and any one edge of the flexible substrate may not be substantially equal to 90°.

20 Claims, 8 Drawing Sheets

INFLEXIBLE REGION    FLEXIBLE REGION

-PRIOR ART-

-PRIOR ART-

ARRAY SUBSTRATE AND METHOD FOR MANUFACTURING THE SAME, FLEXIBLE DISPLAY DEVICE AND ELECTRONIC PRODUCT

CROSS-REFERENCE TO RELATED APPLICATION

This application is the U.S. national phase of PCT Application No. PCT/CN2014/074890 filed on Apr. 8, 2014, which claims priority to Chinese Patent Application No. 201310397778.6 filed on Sep. 4, 2013, the disclosures of which are incorporated in their entirety by reference herein.

TECHNICAL FIELD

The present disclosure relates to a flexible display technology, in particular to an array substrate, a method for manufacturing the same, a flexible display device and an electronic product.

BACKGROUND

A flexible display refers to a kind of a display device or a display technology which may be manufactured to be super-thin, super-large and flexible, by using a flexible substrate. The main features of the flexible display can be described with three words: thin, light and flexible.

A flexible substrate in a prior art is generally divided into two regions: one is an inflexible region, while the other is a flexible region. As shown in FIG. 1, on an array substrate 1, a region where a driving module 4 is provided is the flexible region. The driving module 4 is connected to data lines 2 and gate lines 3 respectively, to drive thin film transistors (TFTs) 5 provided on the panel.

As shown in FIG. 1, in the prior art, the data lines 2 and the gate lines 3 are provided in a manner of being perpendicular to an edge of the flexible substrate. In this case, as shown in FIG. 2, when a display device is flexed in a manner shown in FIG. 2, the gate lines 3 therein is also flexed in the manner shown in FIG. 2.

In the prior art, a metal forming the gate lines has a certain tensile property; however, when the flexing degree exceeds a certain level, it is easy to cause the gate lines to be broken and the equipment to be damaged. If improved from a material, a metal with a higher tensile property has a higher price, which will increase overall cost of the device as a whole.

SUMMARY

Technical Problems to be Solved

An object of an embodiment of the present invention is to provide an array substrate, a method for manufacturing the same, a flexible display device and an electronic product, to improve flexibility of a flexible display substrate without increasing cost of the device.

Technical Solutions

Technical solutions provided by embodiments of the present invention are as follows.

To achieve the above object, an embodiment of the present invention provides an array substrate, at least including a flexible substrate and an array layer formed on the flexible substrate. Here the array layer may include:

signal transmission lines, including a plurality of data lines and a plurality of gate lines intersected with each other on the flexible substrate to form a plurality of sub-pixel regions; and thin film transistors, each of which is provided in a corresponding sub-pixel region of the plurality of sub-pixel regions and connected to a corresponding data line and a corresponding gate line;

wherein an angle between at least a portion of the signal transmission lines and any one edge of the flexible substrate is not substantially equal to 90°.

In the above array substrate, each data line of the plurality of the data lines and each gate line of the plurality of the gate lines may be perpendicular to each other, and an angle between each data line of the plurality of the data lines and one edge of the flexible substrate may be in a range of about 30° to about 60°.

In the above array substrate, the angle between each data line of the plurality of the data lines and one edge of the flexible substrate may be about 45°.

In the above array substrate, the plurality of data lines may include first data lines connected to a first number of thin film transistors and second data lines connected to a second number of thin film transistors.

In the above array substrate, the array substrate may further include a driving module; the number of sub-signals in data drive signals outputted to the first data lines by the driving module within a time period of one frame may be the first number; the number of sub-signals in data drive signals outputted to the second data lines by the driving module within a time period of one frame may be the second number.

In the above array substrate, the plurality of data lines may include first data lines and second data lines whose lengths are greater than those of the first data lines; and the plurality of gate lines may include first gate lines and second gate lines whose lengths are greater than those of the first gate lines.

In the above array substrate, a cross-sectional area of the second data lines may be larger than a cross-sectional area of the first data lines, so that a first transmission delay difference between the first data lines and the second data lines which have different cross-sectional areas is less than a second transmission delay difference between the first data lines and the second data lines which have same cross-sectional areas; and a cross-sectional area of the second gate lines may be larger than a cross-sectional area of the first gate lines, so that a third transmission delay difference between the first gate lines and the second gate lines which have different cross-sectional areas is less than a fourth transmission delay difference between the first gate lines and the second gate lines which have same cross-sectional areas.

In the above array substrate, when cross-sectional heights are the same, a cross-sectional width of the second data lines may be greater than a cross-sectional width of the first data lines; or when cross-sectional widths are the same, the cross-sectional height of the second data lines may be greater than the cross-sectional height of the first data lines; or when the cross-sectional widths and heights are both different, a product of the cross-sectional width and height of the second data lines may be greater than a product of the cross-sectional width and height of the first data lines.

In the above array substrate, when cross-sectional heights are the same, a cross-sectional width of the second gate lines may be greater than a cross-sectional width of the first gate lines; or when cross-sectional widths are the same, the cross-sectional height of the second gate lines may be greater than the cross-sectional height of the first gate lines; or when the cross-sectional widths and heights are both different, a product of the cross-sectional width and height of the second gate lines may be greater than a product of the cross-sectional width and height of the first gate lines.

In the above array substrate, the flexible substrate may be divided into a flexible display region and an inflexible peripheral region, and the array substrate may further include a driving module provided on the peripheral region.

In the above array substrate, the driving module may include a first driving module and a second driving module provided correspondingly on two opposite edges of the flexible substrate, and the plurality of data lines and the plurality of gate lines may be connected respectively to an adjacent driving module within the two driving modules.

To achieve the above object, an embodiment of the present invention provides a flexible display device, including any of the array substrate described above.

To achieve the above object, an embodiment of the present invention provides an electronic product, including the flexible display device described above.

To achieve the above object, an embodiment of the present invention provides a method for manufacturing an array substrate, including steps of:

forming a magnetic field by magnetic strips, wherein on an arrangement direction of data lines/gate lines to be manufactured, magnetic field strength of the magnetic field is firstly increased and then decreased;

bombarding a target material by using plasma inert gas accelerated by an electric field, and forming a metal thin film layer by depositing produced atoms on a surface of the substrate under an effect of the magnetic field;

providing the magnetic strips obliquely on the back of the substrate, wherein an arrangement direction of the magnetic strips is the same as the arrangement direction of data lines/gate lines to be manufactured, and forming the magnetic field by the magnetic strips, wherein a plasma density is high where the magnetic field is strong, so that a thickness of a formed film is high; and etching the metal thin film layer to make it have a regular wavy film thickness, wherein the film thicknesses of longer lines are relatively thick, while the film thicknesses of shorter lines are relatively thin, so as to achieve a uniform signal delay.

An embodiment of the present invention has at least the following advantageous effects:

in an embodiment of the present invention, at least a portion of signal transmission lines are provided obliquely to an edge of the flexible substrate, so that the flexure degree of the signal transmission lines can be decreased when the substrate is flexed, and thereby the flexibility of the substrate is improved.

BRIEF DESCRIPTION OF THE DRAWINGS

In order to more clearly illustrate the technical solutions in embodiments of the present invention or in the prior art, accompanying drawings to be used in the description of embodiments will be described briefly. It is obvious that following described drawings is only some embodiments of the invention, and other drawings can also be obtained according to these drawings for those of ordinary skill in the art without paying creative work.

DETAILED DESCRIPTION

Figure 1:
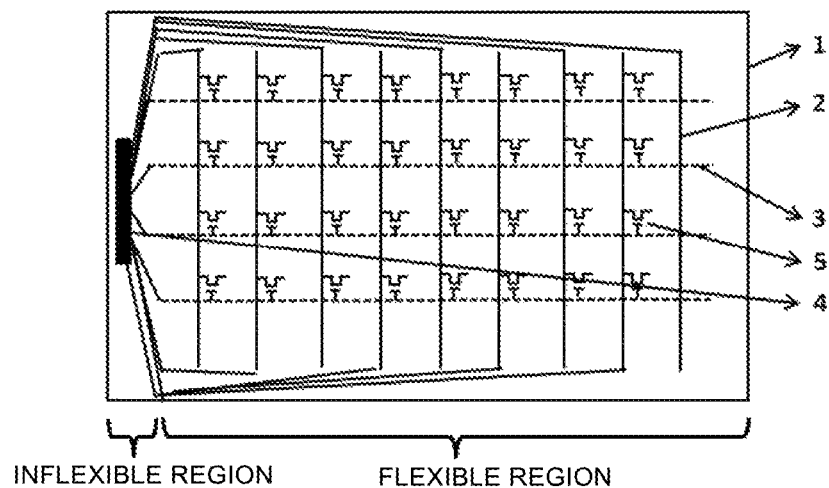
FIG. 1 is a schematic diagram showing a structure of a flexible array substrate according to the prior art.
Figure 2:
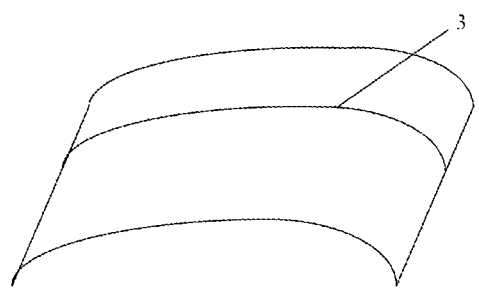
FIG. 2 is a schematic diagram showing a flexure degree of signal transmission lines when a flexible array substrate is flexed according to the prior art.

Embodiments of the present invention will be further described below in conjunction with the accompanying drawings and examples. The following embodiments are only used to illustrate the present invention, but not intended to limit the scope of the present invention.

In order to make the object, technical solutions and advantages of embodiments of the present invention more clear, technical solutions of embodiments of the present invention will be clearly and completely described below in conjunction with the accompanying drawings of the embodiments of the present invention. It is obvious that the described embodiments are only part of embodiments of the present invention, but not all embodiments. All other embodiments obtained by those of ordinary skill in the art based on the described embodiments of the present invention are fallen within the protection scope of the present invention.

Unless otherwise defined, technical terms or scientific terms used herein shall have the general meaning which can be understood by those of ordinary skill in the art. The terms "first", "second" or the like used in the specification and claims of the present invention do not denote any sequence, quantity, or importance, but rather are used to distinguish different components. Similarly, the terms "a" or "an" or the like do not mean quantitative restrictions, but rather indicate the presence of at least one. The terms "connect" or "couple" or the like are not limited to connect physically or mechanically, but may include connecting electrically either directly or indirectly. The terms "up", "down", "left", "right", etc., are merely used to indicate a relative positional relationship; when the absolute position of the described object is changed, the relative positional relationship is changed correspondingly.

Principles and features of the present invention will be described in conjunction with the accompanying drawings. All described embodiments are merely used to illustrate the present invention, but not intended to limit the scope of the invention.

In an array substrate, a method for manufacturing the same, a flexible display device and an electronic product according to an embodiment of the present invention, a portion of signal transmission lines are provided obliquely to an edge of the flexible substrate. Therefore, in comparison with an arrangement of being perpendicular to the edge of the flexible substrate in the prior art, when the flexible array substrate is flexed, a radius of curvature of the signal transmission lines provided obliquely is greater. That is, under a same flexing situation, a flexure degree of the signal transmission lines in the array substrate according to an embodiment of the present invention is relatively small, and thereby the flexibility of the array substrate is improved.

In an embodiment of the present invention, an angle between lines related therein is firstly defined as follows:

In an embodiment of the present invention, a range of the angles between data lines and an edge of the flexible substrate is defined to be in [0°, 90°]. With taking data lines in a display region and edges of the flexible substrate equivalent to straight lines (or segments) as an example, it is explained as follows.

Figure 3A:
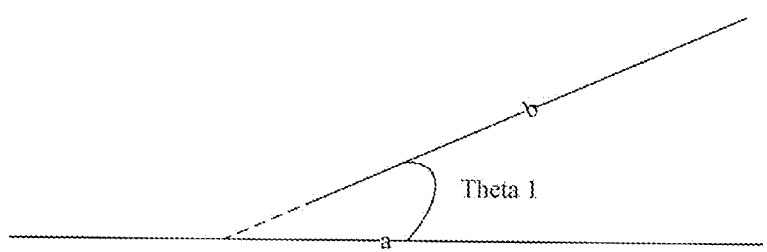
FIGS. 3*a*-3*b* are schematic diagrams showing an angle between a signal transmission line and an edge of an flexible substrate according to an embodiment of the present invention.
Figure 3B:
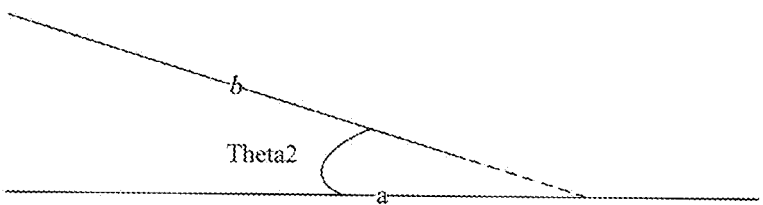

As shown in FIG. 3a, a is assumed as one edge of the flexible substrate, then the angle between a signal transmission line b and a is defined as Theta 1 shown in FIG. 3a. And in FIG. 3b, the angle between signal transmission line b and a is defined as Theta 2 shown in FIG. 3b. When a and b are perpendicular, the angle between a and b is defined as 90°; and when a and b is parallel or coincident, the angle between a and b is defined to as 0°.

Figure 4A:
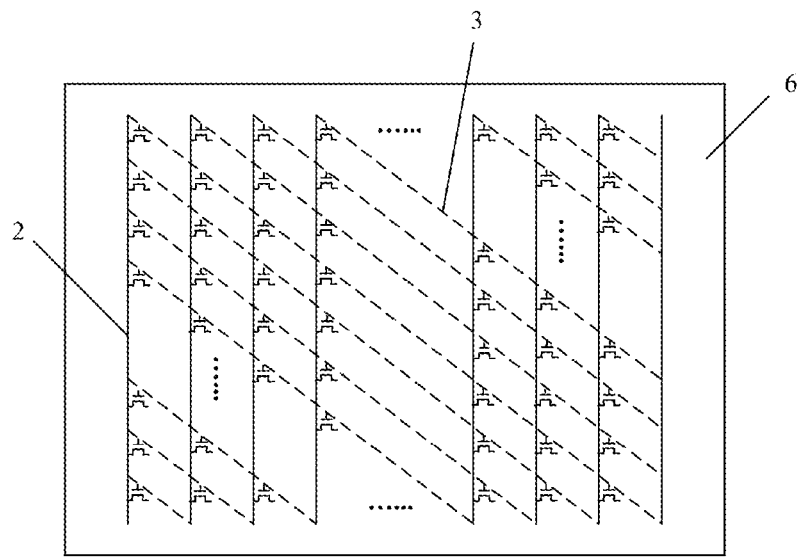
FIGS. 4*a*-4*b* are schematic diagrams showing structures of two array substrates according to an embodiment of the present invention.
Figure 4B:
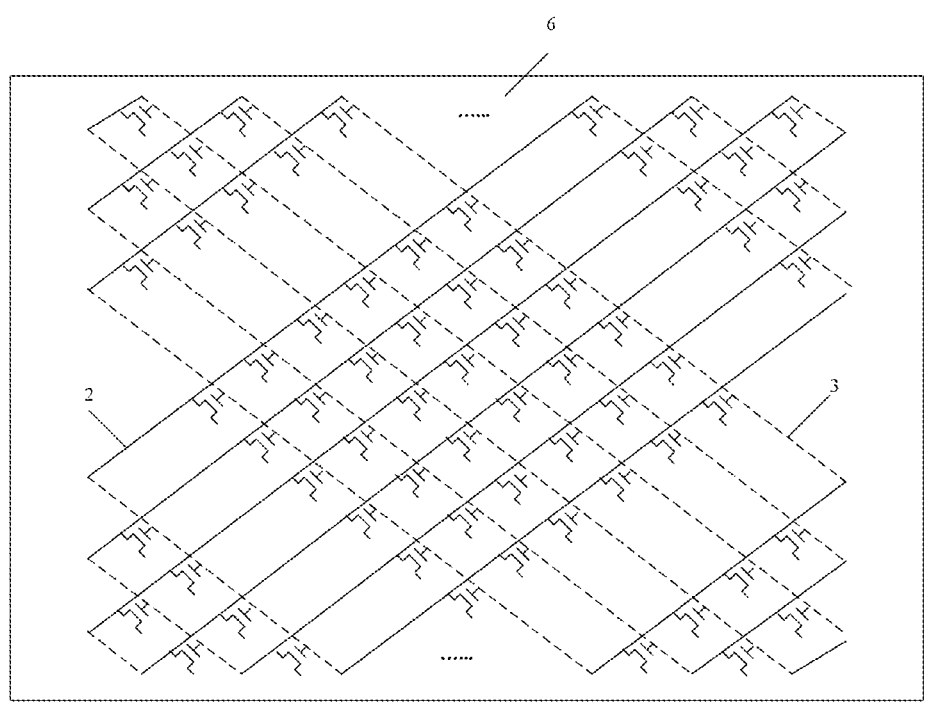

As shown in FIGS. 4a-4b, an array substrate according to an embodiment of the present invention includes a flexible substrate 6 and an array layer formed on the flexible substrate 6. The array layer includes a display region and a non-display region. In the display region, the array layer may include:

signal transmission lines, including a plurality of data lines 2 and a plurality of gate lines 3 intersected with each other on the flexible substrate to form a plurality of sub-pixel regions; and thin film transistors 5, each of which is provided in each sub-pixel region of the plurality of sub-pixel regions and connected to a corresponding data line 2 and a corresponding gate line 3.

Here, an angle between at least a portion of the signal transmission lines and any edge of the flexible substrate 6 is not substantially equal to 90°.

As shown in FIG. 4a, the angles between all gate lines 3 and any edge of the flexible substrate 6 are not equal to 90°. That is, the angles Φ between gate lines 3 and any edge of the flexible substrate may satisfy the following relationship: 0°<Φ<900.

It should be understood that in an embodiment of the present invention, the structure relationship between thin film transistors 5 and data lines 2 or gate lines 3 is simplified. In a general case, a gate electrode of a thin film transistor 5 is connected to a gate line 3, a source (drain) electrode of a thin film transistor 5 is connected to a data line 2, and a drain (source) electrode of a thin film transistor 5 is connected to a pixel electrode (not shown). Since production processes of the drain and source electrodes of the thin film transistor 5 are substantially the same, their names can be interchanged.

Obviously, considering that there should be enough pixels on the flexible substrate, therefore, it may be better the angles Φ between gate lines 3 and one edge of the flexible substrate 6 are in a range of about 30° to about 60°. In an embodiment of the present invention, the angles Φ between gate lines 3 and one edge of the flexible substrate are preferably about 45°.

In FIG. 4a, only the gate lines 3 are arranged obliquely. It should be understood that, data lines 2 may also be obliquely arranged. As shown in FIG. 4b, the angles between all gate lines 3 and any edge of the flexible substrate 6 are not equal to 90°. That is, the angles Φ between gate lines 3 and any edge of the flexible substrate 6 satisfy the following relationship: 0°<Φ<90°. Meanwhile, angles Ψ between data lines 2 and any edge of the flexible substrate 6 satisfy the following relationship: 0°<Ψ<90°.

In the structure shown in FIG. 4b, in an embodiment of the present invention, the data lines 2 and the gate lines 3 may be provided perpendicular to each other, and the angles between data lines 2 and an edge of the flexible substrate 6 is in a range of about 30° to about 60°.

In an embodiment of the present invention, the angles between the data lines and an edge of the flexible substrate are preferably about 45°.

The angular relationship between lines, and comparison relationship of lengths, numbers between lines mentioned in an embodiment of the present invention are all described with taking an example of being in the display region. The flexure of the obliquely arranged signal transmission lines according to an embodiment of the present invention will be described below.

Figure 5:
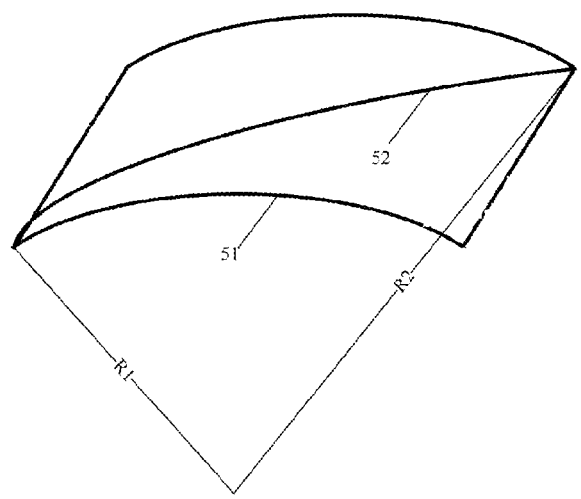
FIG. 5 is a schematic diagram showing an effect comparison of array substrates according to an embodiment of the present invention.

As shown in FIG. 5, it is assumed that in FIG. 5, a reference numeral 51 represents a first signal transmission line arranged vertically to one edge of the flexible substrate in the prior art, while another reference numeral 52 represents a second signal transmission line arranged obliquely to an edge of the flexible substrate according to an embodiment of the present invention. It can be found from the figure that, the length of the second signal transmission line 52 is greater than that of the first signal transmission line 51. Thus in the case where the substrate is flexed as shown in FIG. 5, the second signal transmission line 52 has a radius of curvature R2 greater than a radius of curvature R1 of the first signal transmission line 51. That is, the flexure degree of the second signal transmission line 52 is less than that of the first signal transmission line 51.

In accordance with geometric principles, if the angle between the second signal transmission line 52 and an edge of the flexible substrate is 45°, the radius of curvature of the second signal transmission line 52 is about 1.4 times of that of the first signal transmission line 51.

Therefore, in the embodiment of the present invention, the flexure degree of the signal transmission line is decreased when the substrate is flexed, by providing the signal transmission lines obliquely to one edge of the flexible substrate, so as to improve the flexibility of the substrate. Obviously, the embodiment of the present invention is described with taking that the second signal transmission line has the same material and function as the first signal transmission line in the prior art (e.g., both being as a data line) as an example, but not limited thereto.

In an embodiment of the present invention, in order to protect driving modules, the flexible substrate may be divided into a flexible display region and an inflexible peripheral region. The driving modules are provided in the peripheral region.

Since the rigidity of the peripheral region is better and it is less likely to be flexed relative to the display region, to dispose the driving modules in the peripheral region can improve the protection for the driving modules.

In an embodiment of the present invention, a number of the driving modules may be one, and also may be two or more. With taking that there are two driving modules as an example, the two driving modules are provided correspondingly on two opposite edges of the flexible substrate, and the data lines 2 and the gate lines 3 are connected respectively to an adjacent driving module within the two driving modules.

Figure 6:
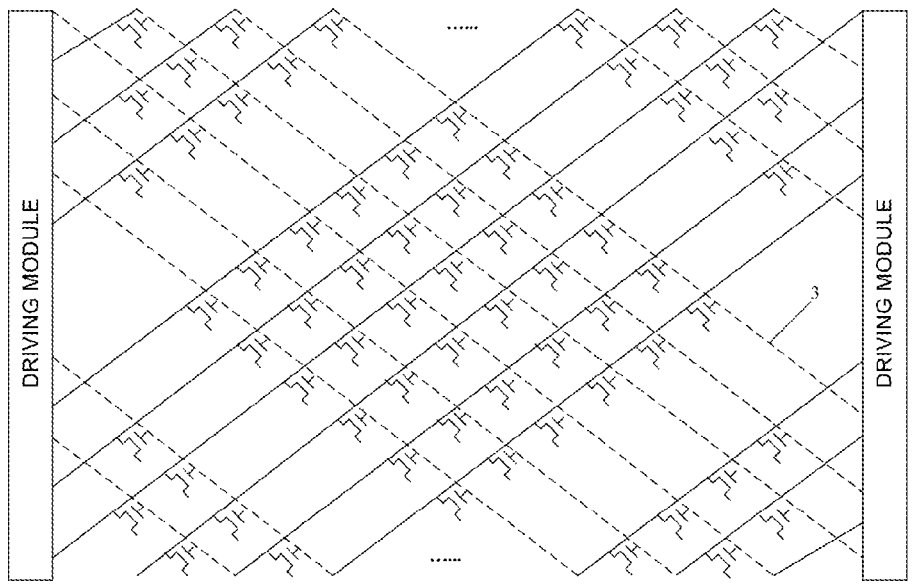
FIG. 6 is a schematic diagram showing a structure of an array substrate provided with two driving modules according to an embodiment of the present invention.

The array substrate including two driving modules is as shown in FIG. 6. It can be found that, the data lines 2 and the gate lines 3 are connected respectively to an adjacent driving module within the two driving modules.

To connect to an adjacent driving module will be described below with a data line 2 and a gate line 3 in FIG. 7.

Figure 7:
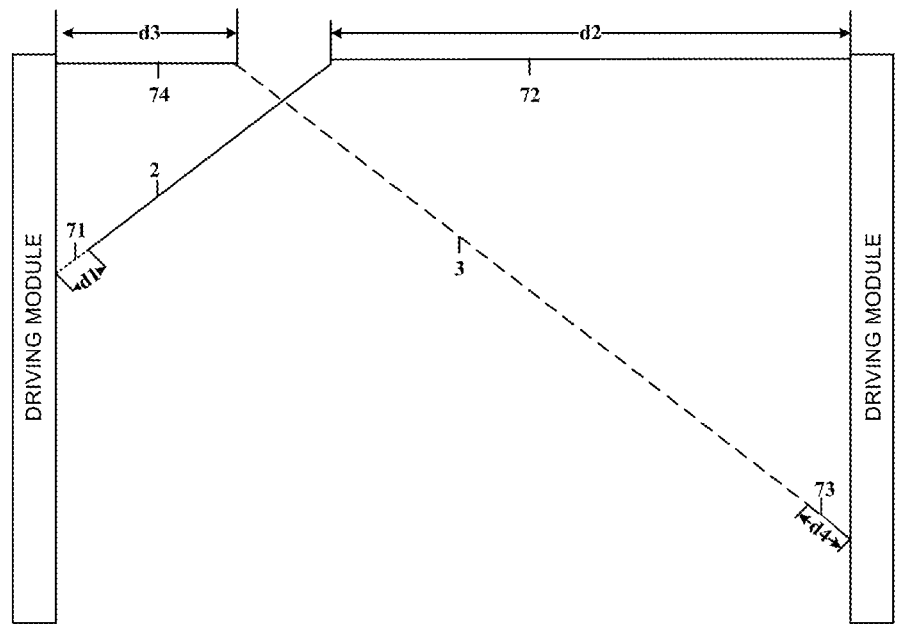
FIG. 7 is a schematic diagram showing connections to an adjacent driving module within the two driving modules when two driving modules are provided according to an embodiment of the present invention.

As shown in FIG. 7, a data line 2 may be connected to a left-hand driving module via a first connection line 71, and may also be connected to a right-hand driving module via a second connection line 72. However, it is obvious that a length d1 of the first connection line 71 is obviously less than a length d2 of the second connecting line 72. Therefore, in accordance with connecting to an adjacent driving module, the data line 2 in FIG. 7 is driven by the left-hand driving module.

As also shown in FIG. 7, a gate line 3 may be connected to the right-hand driving module via a third connection line 73, and may also be connected to the left-hand driving module via a fourth connection line 74. However, it is obvious that a length d3 of the third connection line is obviously less than a length d4 of the fourth connecting line 74. Therefore, in accordance with connecting to an adjacent driving module, the gate line 3 in FIG. 7 is driven by the right-hand driving module.

That is, with respect to any signal transmission line, in accordance with connecting to an adjacent driving module, the connection distance away from the driving module which is connected with currently will be less than or equal to the minimum connection distance away from the other driving module.

As shown in FIG. 6 and FIG. 7, this kind of connection greatly reduces length differences of the connection lines between different signal transmission lines and the driving modules, and so as to reduce transmission delays between the signals transmitted to different signal transmission lines by the driving modules, and improve the system performance.

In the above embodiments, the aforementioned driving module can simultaneously drive data lines 2 and gate lines 3. However, it should be understood that the driving module according to the embodiment of the present invention may also include a data driving module configured to separately drive data lines 2 and a gate driving module configured to separately drive gate lines 3. The gate driving module may be a chip provided independently, and also can be integrated with the array substrate by Gate on Array (GOA).

In an embodiment of the present invention, the above-mentioned data lines 2 and/or the gate lines 3 are obliquely disposed, so that at least two data lines 2 may have different lengths; and at least two gate lines 3 may also have different lengths.

Further, at least two data lines 2 are connected to different numbers of thin film transistors 5, and/or at least two gate lines 3 are connected to different numbers of thin film transistors 5.

For example, the plurality of data lines at least includes first data lines connected to a first number of thin film transistors and second data lines connected to a second number of thin film transistors.

Figure 8:
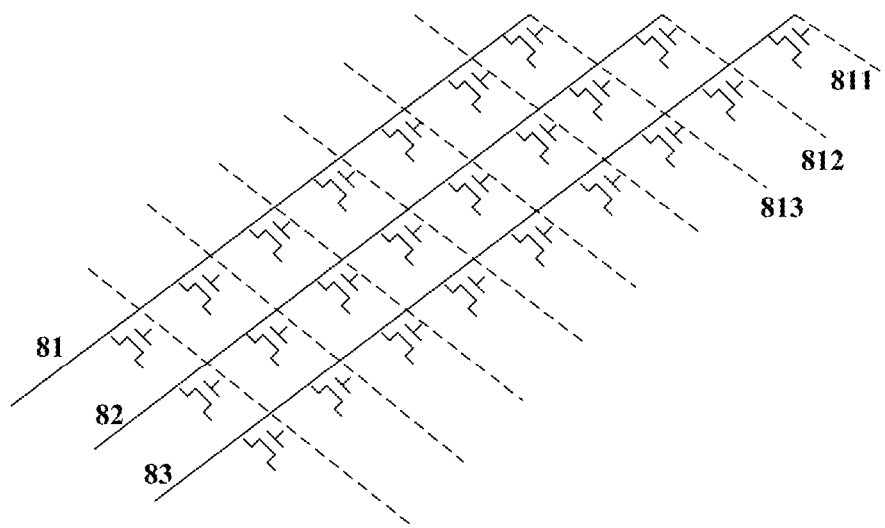
FIG. 8 is a schematic diagram showing that the numbers of thin film transistors connected to different data lines on a flexible array substrate are different according to an embodiment of the present invention.

It should be understood that, the "first" and "second" represent to be not equal when they are used to compare numbers, and to be relative but not specific when they are used to represent a positional relationship. For example, a first number is not equal to a second number. As shown in FIG. 8, a data line 81 may be referred to a first data line, while another data line 82 may be referred to a second data line. And relatively speaking, the data line 82 may be referred to a first data line, while the data line 83 may be referred to a second data line. Further, a first data line (or a first gate line) may refer to one data line (or a gate line), or refer to data lines (or gate lines) with substantially same functions, such as being connected to the same number of thin film transistors (or being of the same length).

Further, the number of sub-signals in data drive signals outputted to the first data lines by the driving module within a time period of one frame is the first number; the number of sub-signals in data drive signals outputted to the second data lines by the driving module within a time period of one frame is the second number.

The sub-signal refers to a signal inputted to a pixel electrode via a TFT by a driving module.

With taking a case shown in FIG. 8 as an example, the data line 81 at the top is connected to seven TFTs, while the data line 82 in the middle is connected to eight TFTs and the data line 83 at the bottom is connected to nine TFTs. At this time, in the array substrate according to an embodiment of the present invention, within a time period of one frame, the number of sub-signals in a data drive signal outputted to the data line 81 at the top by the driving module is 7; the number of sub-signals in a data drive signal outputted to the data line 82 in the middle by the driving module is 8; the number of sub-signals in a data drive signal outputted to the data line 83 at the bottom by the driving module is 9.

Further description will be given below from the perspective of the driving module.

With taking the case shown in FIG. 8 as an example, the data line 81 at the top is connected to seven TFTs; while the data line 82 in the middle is connected to eight TFTs and the data line 83 at the bottom is connected to nine TFTs. the gate line 811 is connected to one TFT, while the gate line 812 is connected to two TFTs and the gate line 813 is connected to three TFTs. At this time, in the array substrate according to an embodiment of the present invention, gate lines are progressively scanned. At Timing t1, the driving module inputs a gate drive signal to the gate line 811, and one thin film transistor is opened; at this time, the driving module input the data drive signal to the data line 83, the number of sub-signals outputted by the driving module is 1. Similarly, at Timing t2, the number of sub-signals of a gate drive signal inputted to the gate line 812 by the driving module is 2; and at this time, the driving module inputs the data drive signal to the data lines 82, 83, thus the number of sub-signals outputted by the driving module is 2. And so on.

In an embodiment of the present invention, the driving module determines the number of sub-signals in a data drive signal according to the number of thin film transistors connected to the data lines, so that it is possible to meet the needs of driving an array substrate on which the numbers of the thin film transistors connected to data lines are different, and a better flexibility compared to the prior art is obtained.

Figure 9:
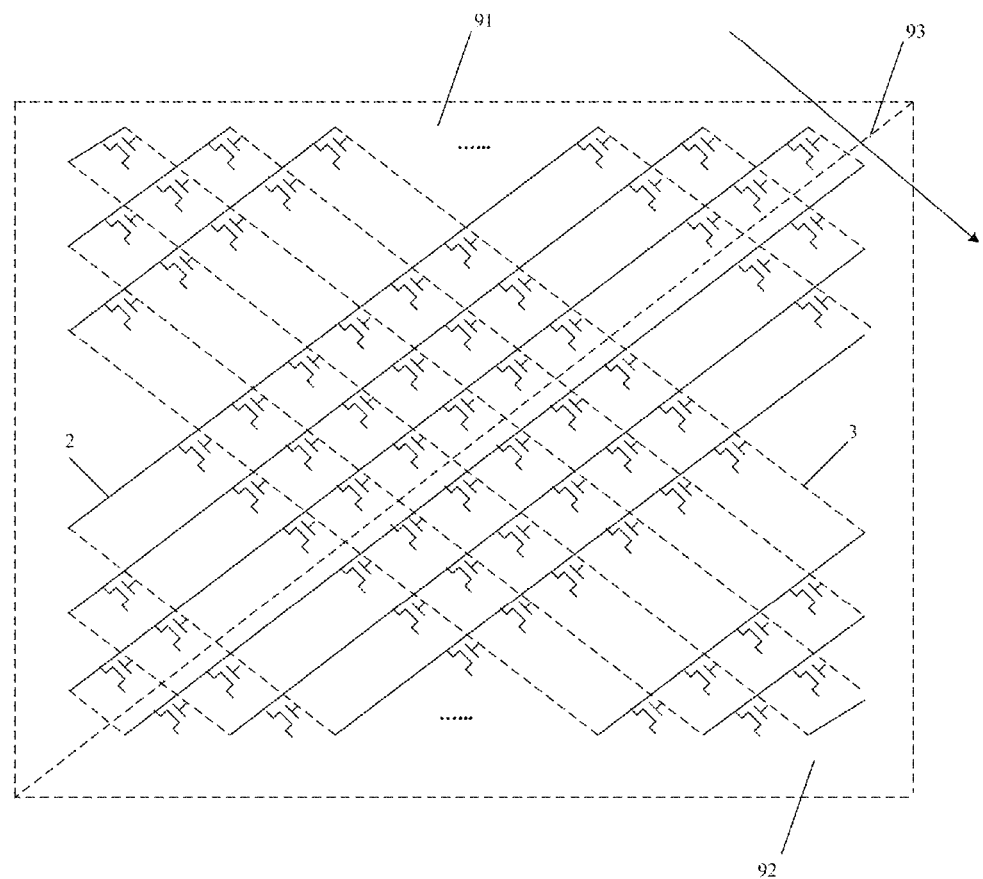
FIG. 9 is a schematic diagram showing that data lines on a flexible array substrate are divided into two portions according to an embodiment of the present invention.

As shown in FIG. 9, in an embodiment of the present invention, on an arrangement direction of the data lines, with taking a diagonal line 93 of the flexible substrate as a boundary, the data lines are divided into a first portion 91 and a second portion 92. For example, data lines located at the upper left half of the flexible substrate belong to the first portion, and data lines located at the lower right half of the flexible substrate belong to the second portion.

In the data lines included in the first portion 91, when viewed from top to bottom, the number of thin film transistors connected to a preceding data line is less than the number of thin film transistors connected to a succeeding data line. In the data lines included in the second portion 92, when viewed from top to bottom, the number of thin film transistors connected to a preceding data line is greater than the number of thin film transistors connected to a succeeding data line.

That is to say, in the arrangement direction of data lines, the numbers of transistors connected to the data lines are increased firstly and then decreased.

Preferably, in the arrangement direction of data lines, the numbers of transistors connected to the data lines are firstly increased as an arithmetic progression with a common difference of P1, and then are decreased as an arithmetic progression with a common difference of P2 (P1 and P2 are both positive integers equal to or greater than 1).

Further, common differences P1 and P2 are equal, i.e., the numbers of transistors connected to the data lines are arranged symmetrically relative to the diagonal line. For example, P1=P2=2.

Figure 10:
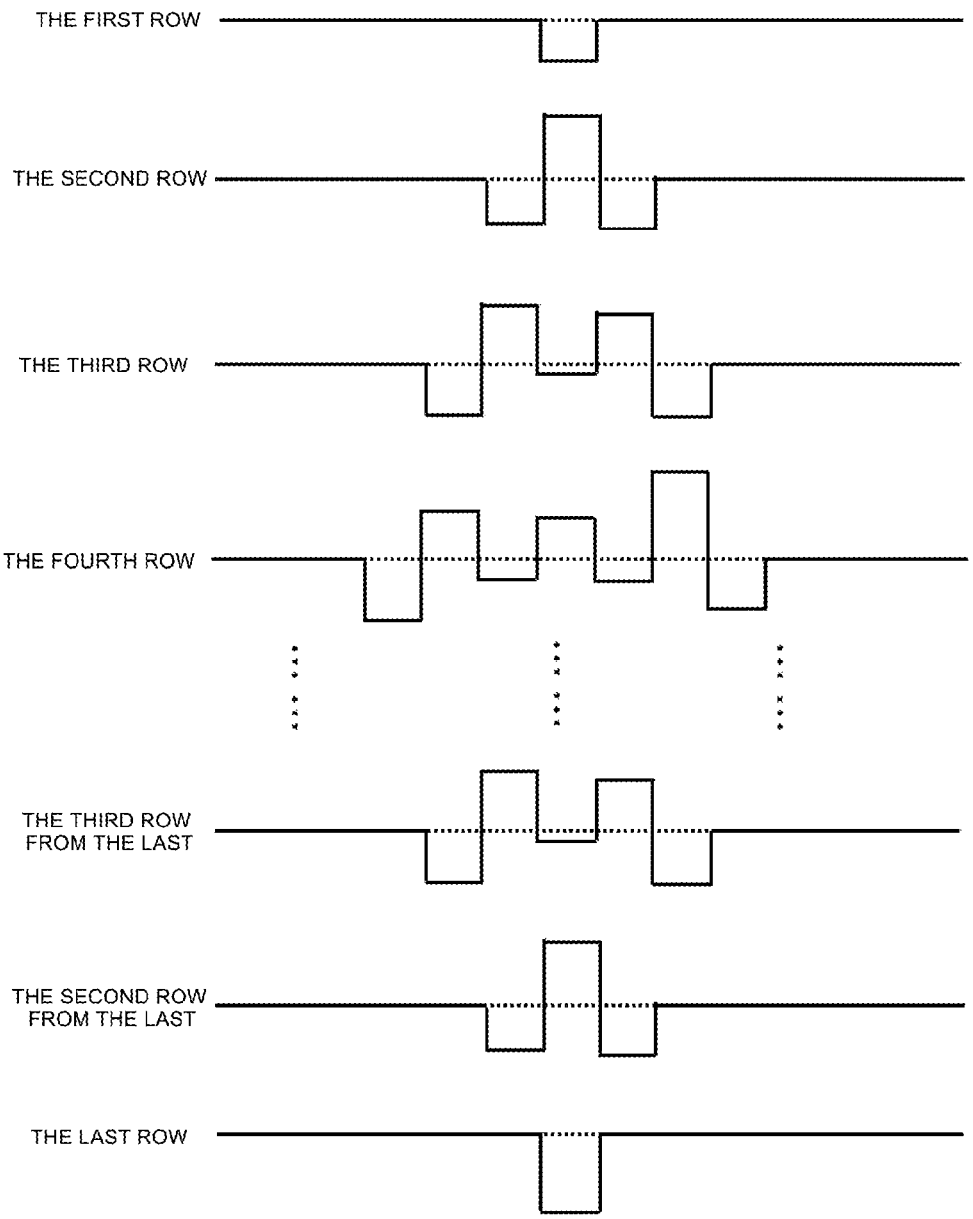
FIG. 10 is a schematic timing diagram of data drive signals according to an embodiment of the present invention.

Assuming that there are 2m data lines, in the arrangement direction of the data lines, the numbers of transistors connected sequentially are 1, 3, 5 . . . 2n−3, 2n−1, 2n−1, 2n−3, . . . , 5, 3, 1 (1≤n≤n, n, m are positive integers). The corresponding data drive signals according to the embodiment of the present invention is shown in FIG. 10.

Figure 11:
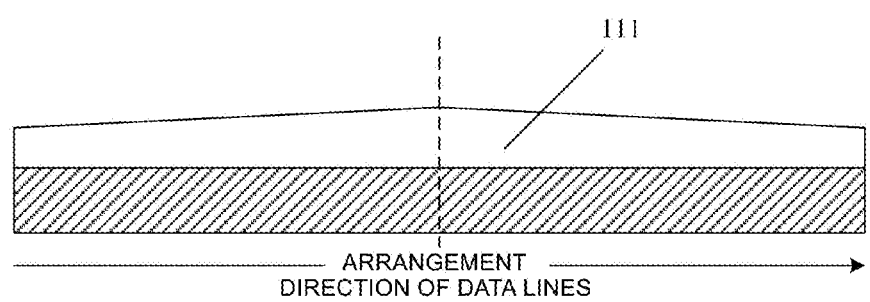
FIG. 11 is a schematic diagram showing a structure of metal thin film layers with different thicknesses and formed according to an embodiment of the present invention.

From FIG. 11 it can be found that, in the arrangement direction of the data lines, the number of sub-signals included in the drive signal transmitted by the driving module firstly increases and then decreases.

In an embodiment of the present invention, after the above-described data lines are disposed obliquely, it will result in that within the plurality of data lines/gate lines, there are first signal transmission lines and second signal transmission lines whose lengths are greater than those of the first signal transmission lines. That is:

there exist first gate lines and second gate lines whose lengths are greater than those of the first gate lines; and/or there exist first data lines and second data lines whose lengths are greater than those of the first data lines.

At this time, in order to reduce the delay between the signal transmission lines, in an embodiment of the present invention, a cross-sectional area of the second signal transmission lines is larger than a cross-sectional area of the first signal transmission lines, so that a first transmission delay difference between the first signal transmission lines and the second signal transmission lines which have different cross-sectional areas is less than a second transmission delay difference between the first signal transmission lines and the second signal transmission lines which have same cross-sectional areas.

That is:

a cross-sectional area of the second data lines is larger than a cross-sectional area of the first data lines, so that a first transmission delay difference between the first data lines and the second data lines which have different cross-sectional areas is less than a second transmission delay difference between the first data lines and the second data lines which have same cross-sectional areas.

a cross-sectional area of the second gate lines is larger than a cross-sectional area of the first gate lines, so that a third transmission delay difference between the first gate lines and the second gate lines which have different cross-sectional areas is less than a fourth transmission delay difference between the first gate lines and the second gate lines which have same cross-sectional areas.

In the array substrate according to an embodiment of the present invention, when there are signal transmission lines with different lengths, according to the length difference of the signal transmission lines, cross-sectional areas of the signal transmission lines generated with different lengths is controlled during the production process. Longer signal transmission lines have larger cross-sectional areas, so its impedance effect is reduced accordingly. Therefore, it is possible to compensate for the delay caused by its longer length, and reduce the time delay difference between the different signal transmission lines, so as to improve the display performance.

In an embodiment of the present invention, any two data lines/gate lines with different lengths may be provided. A cross-sectional area of a data line/gate line with a longer length is greater than a cross-sectional area of a data line/gate line with a shorter length.

In an embodiment of the invention, in order to ensure that the first signal transmission line and the second signal transmission line have different cross-sectional areas, the following methods may be used:

when cross-sectional heights are the same, a cross-sectional width of the second signal transmission line is greater than a cross-sectional width of the first signal transmission line; or when cross-sectional widths are the same, the cross-sectional height of the second signal transmission line is greater than the cross-sectional height of the first signal transmission line; or when the cross-sectional widths and heights are both different, a product of the cross-sectional width and height of the second signal transmission line is greater than a product of the cross-sectional width and height of the first signal transmission line.

That the signal transmission lines are data lines is taken as an example.

For example, in the arrangement direction of the data lines, the cross-sectional areas of data lines may be firstly increased and then decreased with an arithmetic or geometric relationship.

Further, the cross-sectional areas of data lines are arranged symmetrically relative to the diagonal line, as shown in FIG. 11.

In an embodiment of the present invention, a method for manufacturing the array substrate having the above characteristics may include:

forming a metal thin film layer;

etching the metal thin film layer to form a plurality of data lines/gate lines;

wherein the plurality of data lines/gate lines include first signal transmission lines and second signal transmission lines whose length is greater than that of the first signal transmission lines, a cross-sectional area of the second signal transmission lines is larger than a cross-sectional area of the first signal transmission line.

In an embodiment of the present invention, between any two data lines/gate lines with different lengths, a cross-sectional area of a data line/gate line with a longer length is greater than a cross-sectional area of a data line/gate line with a shorter length.

In the manner described above, with reference to FIG. 9, with data lines as an example, in the direction shown by the arrow in FIG. 9, the length of the data lines are firstly increased, and then decreased. According to a technical solution of an embodiment of the present invention, if the width of each of the data lines is same during the etching process, the thicknesses of the data lines are firstly increased, and then decreased, in the arrangement direction of the data lines.

In an embodiment of the present invention, the step of forming a metal thin film layer may be manufactured by a sputtering process.

In the above-described method for manufacturing the array substrate, the step of forming a metal thin film layer may specifically include:

forming a magnetic field by magnetic strips, wherein on an arrangement direction of data lines/gate lines to be manufactured, magnetic field strength of the magnetic field is firstly increased and then decreased;

bombarding a target material by using plasma inert gas accelerated by an electric field, and forming a metal thin film layer by depositing produced atoms on a surface of the substrate under an effect of the magnetic field.

In an embodiment of the present invention, the magnetic strips are provided obliquely on the back of the substrate, wherein an arrangement direction of the magnetic strips is the same as the arrangement direction of data lines/gate lines to be manufactured. The magnetic field is formed by the magnetic strips, wherein a plasma density is high where the magnetic field is strong, so that a thickness of a formed film is high. By providing the magnetic strips on the back of the substrate obliquely, it can exactly correspond to the thickness distribution on the glass substrate, and a metal film thickness distribution is formed as shown in FIG. 11.

FIG. 11 is a schematic sectional view of the metal thin film layer formed after the above process, in the arrangement direction of the data lines, it can be found that the thickness of the formed metal thin film layer 111 is firstly increased and then decreased, and arranged symmetrically.

In accordance with the arrangement direction of the data lines/gate lines to be manufactured, the metal thin film layer formed by depositing may be divided into two portions.

In the arrangement direction of the data lines/gate lines, the thicknesses of a portion of the metal thin film layer are gradually increased, while the thicknesses of the other portion of the metal thin film layer are gradually decreased.

Figure 12:
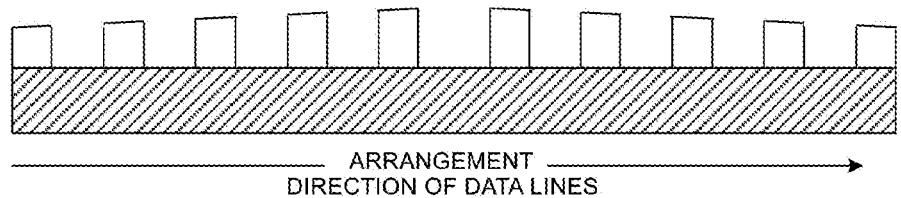
FIG. 12 is a schematic diagram showing a structure of signal transmission lines with different thicknesses and formed by using the metal thin film layers shown in FIG. 11 according to an embodiment of the present invention.

Such a regular wavy film thickness can be achieved as shown in FIG. 12, after the etching is completed, wherein the film thicknesses of longer lines are relatively thick, while the film thicknesses of shorter lines are relatively thin, so as to achieve a uniform signal delay.

Obviously, it should be understood that the above-described data lines/gate lines can also be achieved by printing or other ways, which is not limited specifically to the embodiments of the present invention.

An embodiment of the present invention also provides a flexible display device, including any of the above array substrate. In the flexible display device, the structure and the working principle of the array substrate are similar to the above-described embodiments and omitted here. In addition, the structure of other parts of the flexible display device can refer to the prior art, which will not be described in detail herein. The flexible display device may be: LCD panels, electronic papers, LCD TVs, LCD monitors, digital photo frames, mobile phones, tablet PCs and any other products or parts with display functions.

An embodiment of the present invention also provides an electronic product, including the above-described flexible display device.

The above are only preferred embodiments of the present invention. It should be noted that a number of improvements and modifications can be made without departing from the principles of the present invention for those of ordinary skill in the art, and should be considered to fall within the protection scope of the invention.

What is claimed is:

1. An array substrate, at least comprising a flexible substrate and an array layer formed on the flexible substrate, wherein the array layer comprises:

signal transmission lines, comprising a plurality of data lines and a plurality of gate lines intersected with each other on the flexible substrate to form a plurality of sub-pixel regions; and thin film transistors, each of which is provided in a corresponding sub-pixel region of the plurality of sub-pixel regions and connected to a corresponding data line and a corresponding gate line;

wherein an angle between at least a portion of the signal transmission lines and any one edge of the flexible substrate is not substantially equal to 90°.

2. The array substrate according to claim 1, wherein each data line of the plurality of the data lines and each gate line of the plurality of the gate lines are perpendicular to each other, and an angle between each data line of the plurality of the data lines and one edge of the flexible substrate is in a range of about 30° to about 60°.

3. The array substrate according to claim 2, wherein the angle between each data line of the plurality of the data lines and one edge of the flexible substrate is about 45°.

4. The array substrate according to claim 1, wherein the plurality of data lines comprise first data lines connected to a first number of thin film transistors and second data lines connected to a second number of thin film transistors; and wherein the array substrate further comprises a driving module: the number of sub-signals in data drive signals outputted to the first data lines by the driving module within a time period of one frame is the first number: the number of sub-signals in data drive signals outputted to the second data lines by the driving module within a time period of one frame is the second number.

5. The array substrate according to claim 1, wherein the plurality of data lines comprises first data lines and second data lines whose lengths are greater than those of the first data lines; and a cross-sectional area of the second data lines is larger than a cross-sectional area of the first data lines, so that a first transmission delay difference between the first data lines and the second data lines which have different cross-sectional areas is less than a second transmission delay difference between the first data lines and the second data lines which have same cross-sectional areas.

6. The array substrate according to claim 5, wherein when cross-sectional heights are the same, a cross-sectional width of the second data lines is greater than a cross-sectional width of the first data lines; or when cross-sectional widths are the same, the cross-sectional height of the second data lines is greater than the cross-sectional height of the first data lines; or when the cross-sectional widths and heights are both different, a product of the cross-sectional width and height of the second data lines is greater than a product of the cross-sectional width and height of the first data lines.

7. The array substrate according to claim 1, wherein
the plurality of gate lines comprises first gate lines and second gate lines whose lengths are greater than those of the first gate lines; and
a cross-sectional area of the second gate lines is larger than a cross-sectional area of the first gate lines, so that a third transmission delay difference between the first gate lines and the second gate lines which have different cross-sectional areas is less than a fourth transmission delay difference between the first gate lines and the second gate lines which have same cross-sectional areas.

8. The array substrate according to claim 7, wherein
when cross-sectional heights are the same, a cross-sectional width of the second gate lines is greater than a cross-sectional width of the first gate lines; or when cross-sectional widths are the same, the cross-sectional height of the second gate lines is greater than the cross-sectional height of the first gate lines; or when the cross-sectional widths and heights are both different, a product of the cross-sectional width and height of the second gate lines is greater than a product of the cross-sectional width and height of the first gate lines.

9. The flexible display device according to claim 8, wherein each data line of the plurality of the data lines and each gate line of the plurality of the gate lines are perpendicular to each other, and an angle between each data line of the plurality of the data lines and one edge of the flexible substrate is in a range of about 30° to about 60°.

10. The flexible display device according to claim 8, wherein the plurality of data lines comprise first data lines connected to a first number of thin film transistors and second data lines connected to a second number of thin film transistors; and
wherein the array substrate further comprises a driving module; the number of sub-signals in data drive signals outputted to the first data lines by the driving module within a time period of one frame is the first number; the number of sub-signals in data drive signals outputted to the second data lines by the driving module within a time period of one frame is the second number.

11. The flexible display device according to claim 8, wherein
the plurality of data lines comprises first data lines and second data lines whose lengths are greater than those of the first data lines; and
a cross-sectional area of the second data lines is larger than a cross-sectional area of the first data lines, so that a first transmission delay difference between the first data lines and the second data lines which have different cross-sectional areas is less than a second transmission delay difference between the first data lines and the second data lines which have same cross-sectional areas.

12. The flexible display device according to claim 11, wherein when cross-sectional heights are the same, a cross-sectional width of the second data lines is greater than a cross-sectional width of the first data lines; or when cross-sectional widths are the same, the cross-sectional height of the second data lines is greater than the cross-sectional height of the first data lines; or when the cross-sectional widths and heights are both different, a product of the cross-sectional width and height of the second data lines is greater than a product of the cross-sectional width and height of the first data lines.

13. The flexible display device according to claim 8, wherein
the plurality of gate lines comprises first gate lines and second gate lines whose lengths are greater than those of the first gate lines; and
a cross-sectional area of the second gate lines is larger than a cross-sectional area of the first gate lines, so that a third transmission delay difference between the first gate lines and the second gate lines which have different cross-sectional areas is less than a fourth transmission delay difference between the first gate lines and the second gate lines which have same cross-sectional areas.

14. The flexible display device according to claim 13, wherein
when cross-sectional heights are the same, a cross-sectional width of the second gate lines is greater than a cross-sectional width of the first gate lines; or when cross-sectional widths are the same, the cross-sectional height of the second gate lines is greater than the cross-sectional height of the first gate lines; or when the cross-sectional widths and heights are both different, a product of the cross-sectional width and height of the second gate lines is greater than a product of the cross-sectional width and height of the first gate lines.

15. The flexible display device according to claim 8, wherein the flexible substrate is divided into a flexible display region and an inflexible peripheral region, and the array substrate further comprises a driving module provided on the peripheral region.

16. The flexible display device according to claim 15, wherein the driving module comprises a first driving module and a second driving module provided correspondingly on two opposite edges of the flexible substrate, and the plurality of data lines and the plurality of gate lines are connected respectively to an adjacent driving module within the two driving modules.

17. The array substrate according to claim 1, wherein the flexible substrate is divided into a flexible display region and an inflexible peripheral region, and the array substrate further comprises a driving module provided on the peripheral region.

18. The array substrate according to claim 17, wherein the driving module comprises a first driving module and a second driving module provided correspondingly on two opposite edges of the flexible substrate, and the plurality of data lines and the plurality of gate lines are connected respectively to an adjacent driving module within the two driving modules.

19. The flexible display device according to claim 17, wherein the angle between each data line of the plurality of the data lines and one edge of the flexible substrate is about 45°.

20. A flexible display device, comprising an array substrate, which at least comprises a flexible substrate and an array layer formed on the flexible substrate, wherein the array layer comprises:
- signal transmission lines, comprising a plurality of data lines and a plurality of gate lines intersected with each other on the flexible substrate to form a plurality of sub-pixel regions;
- thin film transistors, each of which is provided in a corresponding sub-pixel region of the plurality of sub-pixel regions and connected to a corresponding data line and a corresponding gate line; and
- wherein an angle between at least a portion of the signal transmission lines and any one edge of the flexible substrate is not substantially equal to 90°.

* * * * *